Patented Feb. 22, 1938

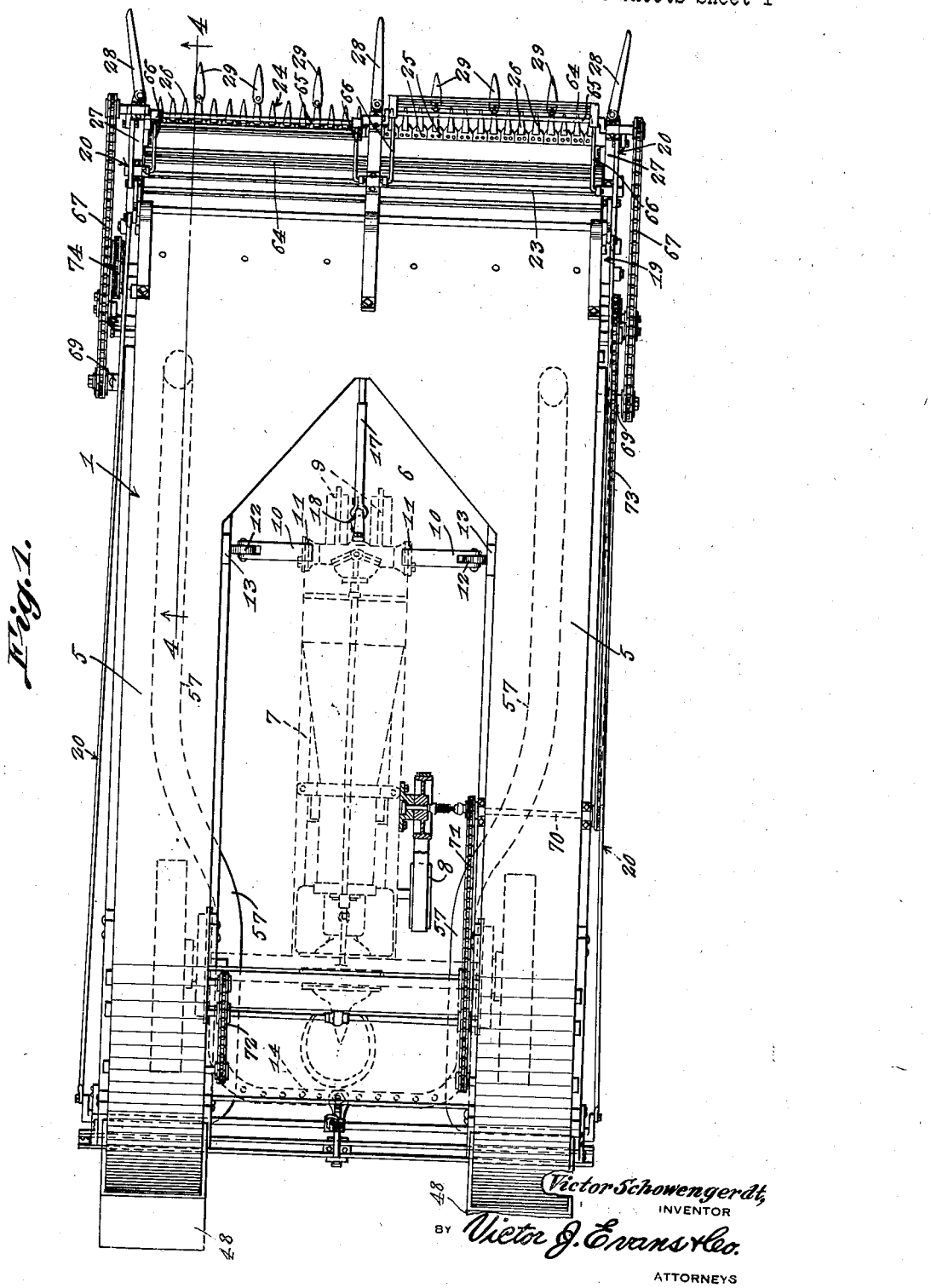

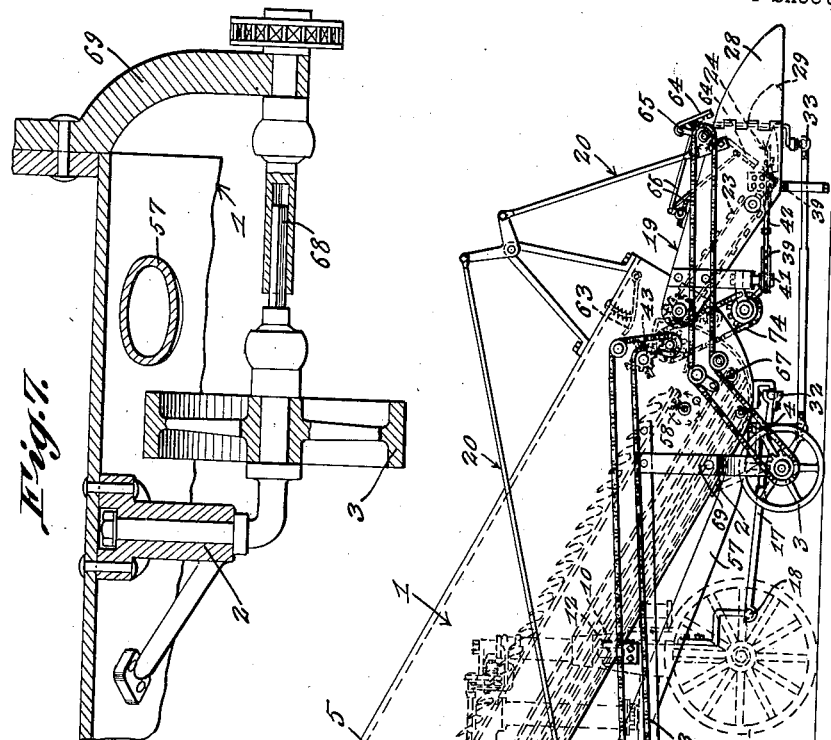
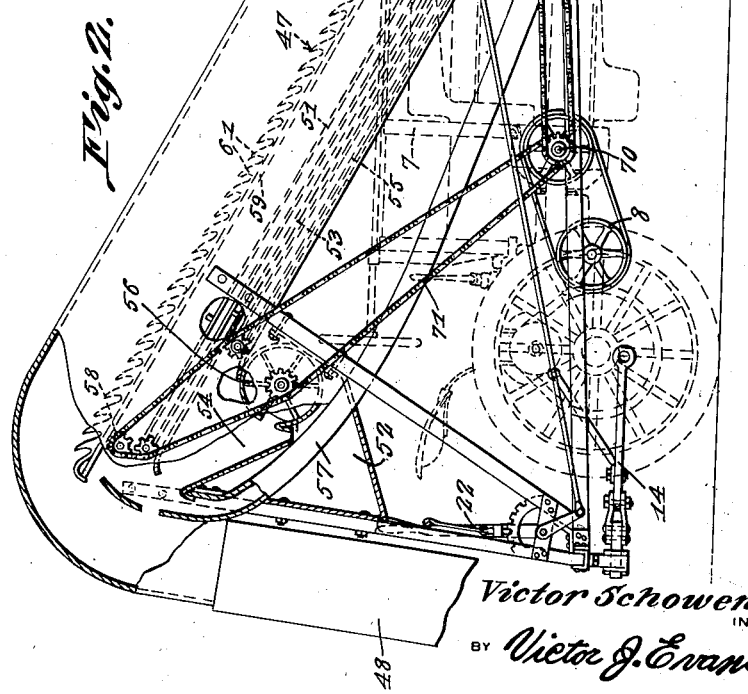

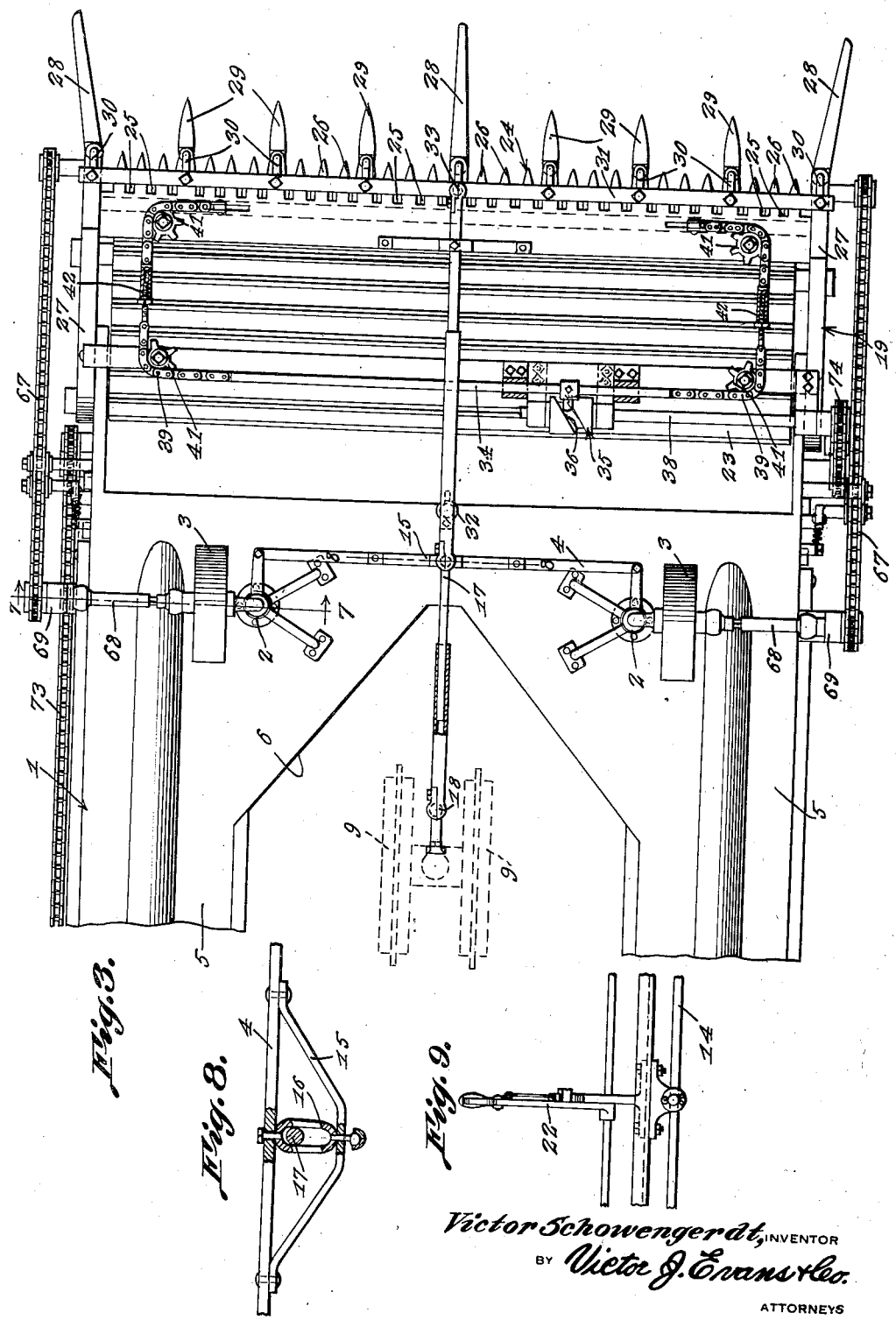

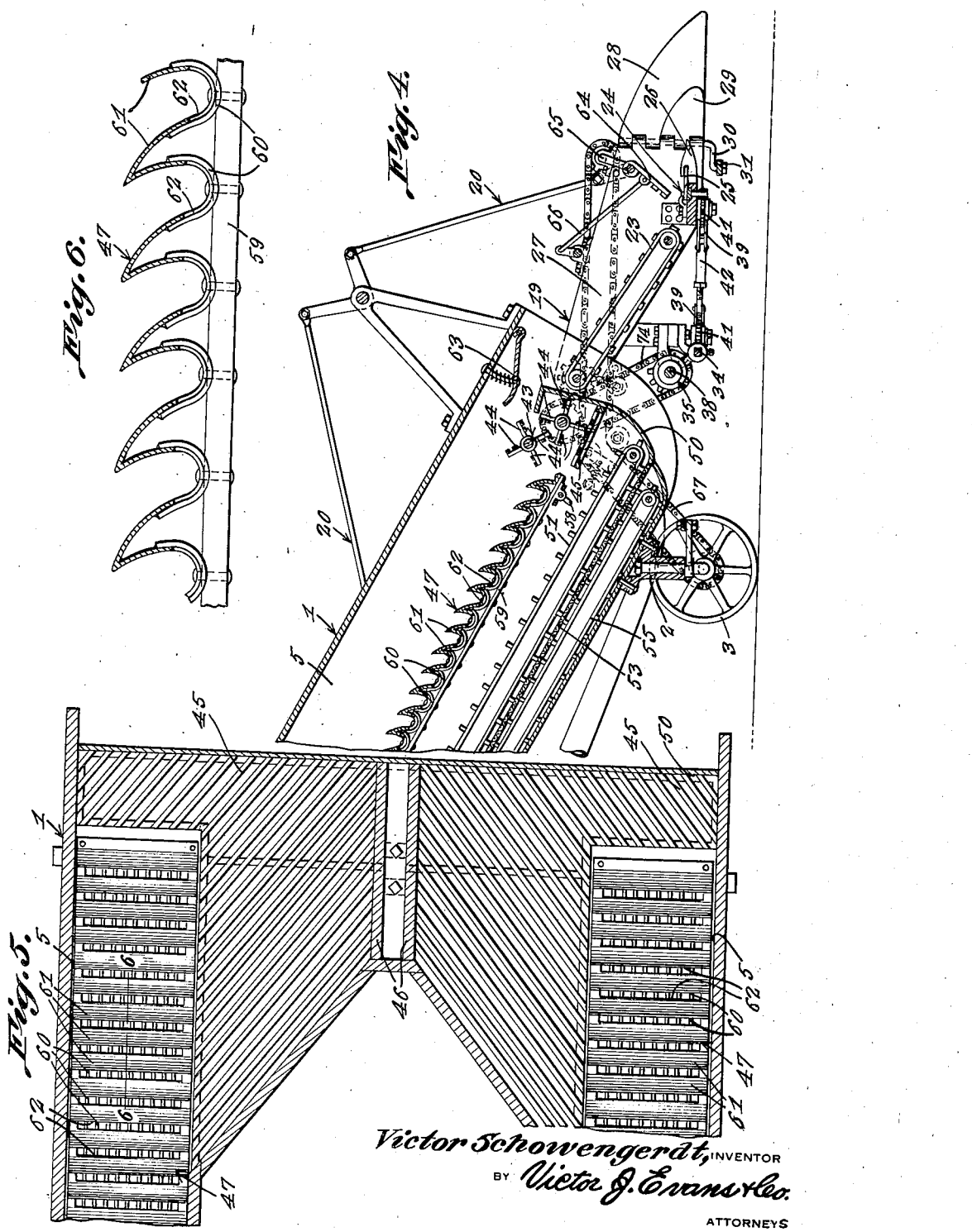

2,109,436

UNITED STATES PATENT OFFICE 2,109,436

HARVESTER AND THRESHER

Victor Schowengerdt, Chamois, Mo.

Application November 20, 1936, Serial No. 111,927

8 Claims. (Cl. 56—21)

This invention relates to agricultural combines and has for the primary object the provision of a device of this character which is especially constructed so that its propulsion and operation may be had from a tractor and is so arranged that it travels in advance of said tractor and steered by the steering of said tractor and completes in one operation the cutting of standing grain of different heights, threshing and separating of the grain from the straw and chaff and collecting the grain in a clean state and discharging the straw and chaff rearwardly of the tractor and in close proximity to the ground.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a combine constructed in accordance with my invention and showing the same associated with a tractor.

Figure 2 is a side elevation, partly in section, illustrating the same.

Figure 3 is a fragmentary bottom plan view partly in section showing the cutting mechanism of the combine and the means for effecting steering of the latter by the steering of the tractor.

Figure 4 is a fragmentary vertical sectional view showing means of delivering the cut grain and the cutting mechanism to the threshing and separating mechanism and taken on the line 4—4 of Figure 1.

Figure 5 is a fragmentary plan view showing a grating means for the transfer of the straw from the threshing means to the shaking means and permitting the grain to be separated from the straw.

Figure 6 is a fragmentary sectional view taken on the line 6—6 of Figure 5.

Figure 7 is a fragmentary sectional view taken on the line 7—7 of Figure 3.

Figure 8 is a sectional view taken on the line 8—8 of Figure 3.

Figure 9 is a fragmentary elevational view showing the hand control for raising and lowering the cutting mechanism.

Referring in detail to the drawings, the numeral 1 indicates the housing of a combine equipped with axles 2 of the steering type on which are journaled the ground wheels 3. The steering axles 2 are connected by a bar 4 to bring about movement of the axles in unison. The housing 1 includes upwardly and rearwardly extending portions 5 providing therebetween a space 6 in which operates a tractor 7 of a conventional construction including a power takeoff pulley 8. The front steering wheels of the tractor are indicated at 9 and are steered by a conventional steering mechanism (not shown). Adjacent the forward end and at opposite sides of the tractor are guide arms 10 hinged to the tractor, as shown at 11, and equipped with rollers 12 which ride on guides 13 carried by the housing for the purpose of aiding in keeping the housing properly located with respect to the tractor and with the forward portion of the housing arranged directly in advance of the tractor. A suitable frame 14 is connected to the rear portion of the tractor and to the housing for cooperating with the guide arms 10 in maintaining the housing in proper relation to the tractor.

A bracket 15 is secured to the bar 4 and includes a pivotaly mounted loop 16 to slidably receive a horizontally arranged guide rod 17 and the latter has a suitable ball and socket connection 18 with the steering mechanism of the tractor. The guide rod 17 may be of telescopic construction, as shown in Figure 3. The guide rod 17 acts to turn the wheels of the combine in the same direction that the front steering wheels of the tractor turn, thereby causing the combine to travel in a proper course in advance of the tractor.

A cutting mechanism frame 19 is located at the forward end of the housing and said end of the housing is fully open. The frame 19 is hinged to the forward end of the housing whereby it may be manually raised and lowered with respect to the ground through the manipulation of a suitable control mechanism 20, the hand lever 22 thereof being located in convenient reach of the operator of the tractor when seated on the latter. Carried by the frame 19 and also by the forward end of the housing is an upwardly and rearwardly extending endless conveyor 23. Arranged in advance of the conveyor 23 and mounted on the frame 19 is a cutting mechanism 24 consisting of a slidably mounted sickle bar 25 and spaced guards 26 therefor. The frame 19 includes side boards 27 and hinged to said frame in advance of the cutting mechanism are intermediate and end grain boards 28 which proceed in advance of the cutting mechanism, for the purpose of guiding standing grain of different heights into engagement with the cutting mechanism. The cutting mechanism also has in advance thereof a series of pivotally mounted guards 29 acting to further aid in directing the standing grain into engagement with the cutting mechanism. The guards 29 and grain boards 28 have secured to the pivoted ends thereof crank arms 30 and which are pivotally connected to an operating bar 31. The bar 31 brings about movement of the grain boards and guards in unison and in opposite directions in accordance with the direction of travel of the combine. In other words, the grain boards and guards are shifted in the direction of the turn made by the tractor. This is accomplished by a guide rod suitably mounted on the frame 19 and connected to the bar 31 and to the bracket 15 of the bar 4 by a ball and socket joint 32. The guide bar extends under the frame 19 and may be of telescopic construction. A ball and socket joint is employed for connecting the guide bar to the bar 31, as shown at 33. Thus it will be seen that the steering of the tractor in the usual manner brings about steering of the combine and also causes the grain boards 28 and guards 29 to swing in the direction of the turn to assure proper gathering and directing the grain to the cutting mechanism.

A driven shaft 34 is mounted for sliding movement on the frame 19 and is reciprocated by a cam mechanism 35 consisting of a grooved cam 36 receiving a pin 37 secured to the driven shaft 34. The cam 36 is secured to a shaft 38 journaled on the frame 19. The driven shaft 34 has connected to its ends sprocket chains 39 which are in turn connected to the sickle bar 25 for the purpose of reciprocating the latter by the reciprocation of the shaft 34. The sprocket chains 39 are supported by sprocket wheels 41 carried by the frame 19 and each sprocket chain is adjustable as to length, as shown at 42.

Arranged rearwardly of the conveyor 23 and within the housing 1 is a threshing mechanism 43 to receive the grain and straw from the conveyor and subjecting the straw to a beating action to remove grain therefrom. The threshing mechanism 43 includes oppositely rotating bladed elements 44 with a grating type platform 45 disposed thereunder and supported by the housing 1. The platform 45 inclines upwardly and rearwardly and is provided with a central partition 46 for dividing the straw into portions and directing said straw towards the portions 5 of the housing 1 and onto shakers 47 arranged in the portions 5 of the housing 1 and associated with the platform. The shakers incline upwardly and rearwardly from the platform to receive from said platform the straw and impart thereto a shaking motion to remove or free the straw entirely of grain. The shakers are of the reciprocating type and will bring about upward and rearward movement of the straw to deliver said straw into exhaust pipes 48 connected with the rear ends of the portions 5 of the housing and which depend downwardly in rear of the tractor and terminate in close proximity to the ground for the purpose of delivering the straw onto the ground with scattering of the straw reduced to a minimum. The rotating elements 44 or the blade portions thereof produce a severe beating to the straw as the straw passes between said bladed elements. The grain thus removed from the straw falls through the platform 45 and is caught in a pan 50 located in the housing 1 and is taken therefrom by upwardly and rearwardly extending endless conveyors 51 and delivered to a grain bin 52 located at the rear end of the combine. A screen 53 underlies the conveyors 51 and extends from the pan 50 to chutes 54 leading to the bin 52. The conveyor 51 travels in a direction so that its lower run carries the grain over the screen to the chutes 54 and the grain passes through said chutes by gravitation to the bin 52. Operating under the screen 53 and in contact therewith is an endless conveyor 55 for receiving grain and materials falling through the screen and acts to carry the latter to blowers 56 located in the housing 1 and adjacent the rear ends of the portions 5. The blowers 56 are of the rotary type and exhaust into the chutes 54 slightly above the discharge ends of the chutes, as clearly shown in Figure 2, so that blasts of air pass upwardly through the chutes 54 and enter the upper ends of the exhaust pipes 48. Connected to the chutes 54 where the latter communicate with the exhaust pipes are conveyor pipes 57 and the latter extend downwardly and are connected to the pan 50 below the screen 53 so that any grain which may be blown towards the exhaust pipes 48 with the chaff may be caught or gravitate into said conveyor pipes and delivered by gravitation to the pan 50 for movement again to the grain chutes 54 by the conveyor 55, so that eventually all of the grain threshed will be received by the bin 52 in a clean state free of chaff and other foreign matter. The chaff removed from the grain by the blowers is delivered into the exhaust pipes 48 along with the straw received from the shakers 47. The shakers 47 are mounted on crank shafts 58 and receive therefrom reciprocal motion as well as an upward and downward motion which with the reciprocal motion causes what may be termed as a jigging motion to the shakers. The reciprocal motion of the shakers brings about advancing of the straw upwardly and rearwardly through the portions 5 of the housing to the exhaust pipes 48. Each shaker 47 consists of a shaker frame 49 to which is secured relatively spaced slotted cups 60 to receive the corrugations of a corrugated member 61, the corrugations thereof being slotted, as shown at 62. The corrugations define a series of straw receiving pockets and each corrugation is slightly curved in the direction of the rear end of the combine or towards the exhaust pipes 48 so that during the reciprocal movement of the shakers the straw will be advanced from one pocket to the other towards the rear of the combine for deliverance finally to the exhaust pipes. The grain removed by the shaking operation may gravitate through the slots of the corrugations and the slots of the shakers to the conveyors 51 and thence to the pan 50 and from the latter over the screen 53 and finally to the chutes 54, where the grain is acted on by the air blasts to remove chaff therefrom permitting the grain to enter the bin 52 in a clean state.

A pivotally mounted and spring pressed shield 63 is located at the receiving or open end of the housing 1 for directing the straw and grain from the conveyor 23 to the beaters 44. Arranged over the cutting mechanism are paddles 64 for the purpose of passing the grain or straw as cut by the cutting mechanism to the conveyor 23 and said paddles have a forward and rearward movement, also rise and fall so as to engage with the standing grain and aid in directing said grain to the cutting mechanism and pass the same rearwardly from the cutting mechanism to the conveyor 23. The paddles are journaled on cranks of a crank shaft 65 and are prevented from rotating with the cranks by suitable linkage 66. The crank shaft is journaled on the end boards 28 which also provide the mounting for the linkage 66.

The crank shaft 65 is connected to the ground wheels 3 of the combine by sprocket chains 67 so that during the movement of the combine for cutting the grain the paddles 64 will be driven to aid in directing grain to the cutting mechanism and for feeding cut grain onto the conveyor 23.

Shafts 68 are secured to the hubs of the ground wheels 3 of the combine and are rotatably supported by bearings 69 and are provided with sprocket gears over which the sprocket chains 67 are trained. The shafts 68 thereby provide the connections between the sprocket chains and the ground wheels and said shafts 68 may be telescopic and provided with suitable universal joints so that the ground wheels 3 may be turned in either direction for steering and still deliver power to the sprocket chains 67.

A power shaft 70 is journaled on the combine and is further supported by a bearing on the tractor and includes universal joints to permit the housing 1 of the combine to have movement relative to the tractor. The shaft 70 is belted to the power takeoff pulley 8 of the tractor. A sprocket chain 71 delivers power from the shaft 70 to the upper shafts of the conveyors 51 and 55 and also drives one of the blowers and the other blower is connected to one of the conveyor shafts by a sprocket chain 72. A sprocket chain 73 is connected to the shaft 70 and to the rotating elements 44 of the threshing mechanism 43 in such a way that said rotating elements will be driven in opposite directions. A sprocket chain 74 connects the shaft 38 to one of the rotating elements 44 for the purpose of driving the sickle bar of the cutting mechanism and also connected with the sprocket chain 74 is one of the shafts of the conveyor 23. Thus it will be seen that the cutting mechanism, threshing mechanism, conveying mechanism and cleaning mechanism are all driven from power derived from the tractor, while the paddles 64 are driven from the ground wheels of the combine.

It will be noted that the combine described and connected with the tractor may be entirely controlled by the operator of the tractor, thus reducing to a minimum the manpower necessary for the operation of the combine. Also it is to be understood that the operator from a position on the tractor can have a clear view forwardly of the combine permitting easier control and operation of both the tractor and the combine for the purpose of guiding the combine in a course to cut the standing grain without danger of the grain being mashed down and further, by the construction and arrangement of the combine with respect to the tractor the cutting sweep is such that the grain may be cut and harvested without wastage due to certain uncut grain being mashed down by the cutting operation of the device.

Having described the invention, I claim:

1. A combine comprising a housing including a front portion and upwardly and rearwardly extending side portions defining therebetween a tractor receiving space, means connecting the housing to a tractor, a cutting mechanism located in advance of the front portion of the housing and connected thereto for movement in an upward and downward direction with respect to the ground, manual means for adjusting the cutting mechanism relative to the ground, means for driving the cutting mechanism by power from the tractor, ground wheels for supporting the housing, threshing means located in the housing rearwardly of the cutting mechanism and driven by power from the tractor, grain separating means receiving threshed straw of the grain from the threshing mechanism to further separate any grain from the straw that may be left therein, exhaust means for receiving the straw from the separating means, a collecting bin carried by the housing, and means for conveying the grain separated from the straw to the collecting bin.

2. A combine comprising a housing having a space to receive a tractor, with a portion of the housing arranged forwardly of the tractor, means connecting said housing to the tractor, ground wheels for supporting the housing and of the steering type, steering means for said ground wheels and actuated by the steering of the tractor, a cutting mechanism carried by the housing in advance thereof and driven by power derived from the tractor and including movably mounted grain deflecting means, and means connecting said grain deflecting means with the steering means for swinging said grain deflecting means in the direction in which the tractor is proceeding, and means for threshing and separating grain from the grain cut by the cutting mechanism.

3. A combine comprising a housing including a forward portion and upwardly and rearwardly extending spaced portions defining a space to receive a tractor, means connecting the tractor to the housing, ground wheels of the steering type supporting the housing, a combined cutting and conveying mechanism carried by the front portion and adjustable relative thereto and with respect to the ground and driven by power derived from the tractor, said cutting mechanism including hingedly mounted guards and grain deflecting boards, means for swinging the guards and deflecting boards in the direction of travel of the tractor by the steering of said tractor, said last-named means effecting steering of the ground wheels in a corresponding direction with the tractor.

4. A combine comprising a housing arranged in advance and extending rearwardly on opposite sides of a tractor, means connecting said housing to the tractor, ground wheels of the steering type for supporting the housing, a cutting mechanism driven by the tractor and located in front and supported by said housing and including grain gathering means movably mounted, means for steering the ground wheels and for swinging the grain gathering means by the steering of the tractor, a threshing means in the housing to receive the grain cut by said cutting mechanism, a bin carried by said housing, exhaust pipes carried by the rear portion of the housing and located rearwardly of the tractor and terminating in close proximity to the ground, and means for separating the grain and straw and delivering said grain to the bin and the straw to said exhaust pipes.

5. A combine comprising a housing arranged in advance and extending rearwardly on opposite sides of a tractor, means connecting said housing to the tractor, ground wheels of the steering type for supporting the housing, a cutting mechanism driven by the tractor and located in front and supported by said housing and including grain gathering means movably mounted, means for steering the ground wheels and for swinging the grain gathering means by the steering of the tractor, a threshing means in the housing to receive the grain cut by said cutting mechanism, a bin carried by said housing, exhaust pipes carried by the rear portion of the housing and located rearwardly of the tractor and terminating in close proximity to the ground, a grating in the housing to separate the straw from the grain received from the threshing mechanism, combined shakers and conveyors for receiving the straw and acting to direct said straw to the exhaust pipes, and means for conveying the grain to the bin.

6. A combine comprising a housing arranged in advance and extending rearwardly on opposite sides of a tractor, means connecting said housing to the tractor, ground wheels of the steering type for supporting the housing, a cutting mechanism driven by the tractor and located in front and supported by said housing and including grain gathering means movably mounted, means for steering the ground wheels and for swinging the grain gathering means by the steering of the tractor, threshing means in the housing to receive the grain cut by said cutting mechanism, a bin carried by said housing, exhaust pipes carried by the rear portion of the housing and located rearwardly of the tractor and terminating in close proximity to the ground, a grating in the housing to separate the straw from the grain received from the threshing mechanism, combined shakers and conveyors for receiving the straw and acting to direct said straw to the exhaust pipes, a conveyor for conveying the grain separated from the straw to the bin, means driving said conveyor and shakers by power derived from the tractor, and blowers for separating chaff from the grain and delivering said chaff to the exhaust pipes.

7. A combine comprising a housing arranged in advance and extending rearwardly on opposite sides of a tractor, means connecting said housing to the tractor, ground wheels of the steering type for supporting the housing, a cutting mechanism driven by the tractor and located in front and supported by said housing and including grain gathering means movably mounted, means for steering the ground wheels and for swinging the grain gathering means by the steering of the tractor, a threshing means in the housing to receive the grain cut by said cutting mechanism, a bin carried by said housing, exhaust pipes carried by the rear portion of the housing and located rearwardly of the tractor and terminating in close proximity to the ground, a grating in the housing to separate the straw from the grain received from the threshing mechanism, combined shakers and conveyors for receiving the straw and acting to direct said straw to the exhaust pipes, a conveyor for conveying the grain separated from the straw to the bin, means driving said conveyor and shakers by power derived from the tractor, blowers acting on the grain prior to reaching the bin to remove therefrom chaff and direct said chaff into the exhaust pipes, and means for receiving grain which may be discharged by the blowers in the direction of the exhaust pipes for returning said grain to the bin.

8. A combine comprising a housing arranged in advance and extending rearwardly on opposite sides of a tractor, means connecting said housing to the tractor, ground wheels of the steering type for supporting the housing, a cutting mechanism driven by the tractor and located in front and supported by said housing and including grain gathering means movably mounted, means for steering the ground wheels and for swinging the grain gathering means by the steering of the tractor, a threshing means in the housing to receive the grain cut by said cutting mechanism, a bin carried by said housing, exhaust pipes carried by the rear portion of the housing and located rearwardly of the tractor and terminating in close proximity to the ground, a grating in the housing to separate the straw from the grain received from the threshing mechanism, combined shakers and conveyors for receiving the straw and acting to direct said straw to the exhaust pipes, a conveyor for conveying the grain separated from the straw to the bin, means driving said conveyor and shakers by power derived from the tractor, blowers acting on the grain prior to reaching the bin to remove therefrom chaff and direct said chaff into the exhaust pipes, inclined pipes for receiving grain which may be redirected from the bin by the blowers acting on said grain to remove the chaff therefrom, a conveyor for receiving the last-named grain and for delivering said grain to the blowers.

VICTOR SCHOWENGERDT.